United States Patent
Chemelli et al.

(10) Patent No.: US 10,612,637 B2
(45) Date of Patent: Apr. 7, 2020

(54) DRIVELINE COMPONENT HAVING DIFFERENTIAL ASSEMBLY WITH DIFFERENTIAL GEARSET CONFIGURED TO LIMIT INBOARD THRUST OF SIDE GEARS

(71) Applicant: American Axle & Manufacturing, Inc., Detroit, MI (US)

(72) Inventors: Douglas J. Chemelli, Royal Oak, MI (US); Jeffrey L. Kincaid, Clarkston, MI (US); Stephen C. Doud, Lake Orion, MI (US); Derek C. Remillong, Belle River (CA); Joseph S. Balenda, II, Grand Blanc, MI (US); Ramanand R. Shetty, Shelby Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 107 days.

(21) Appl. No.: 15/873,926

(22) Filed: Jan. 18, 2018

(65) Prior Publication Data

US 2019/0219142 A1   Jul. 18, 2019

(51) Int. Cl.
F16H 55/20 (2006.01)
F16H 48/08 (2006.01)
F16H 48/38 (2012.01)
F16H 48/40 (2012.01)

(52) U.S. Cl.
CPC ............ *F16H 48/08* (2013.01); *F16H 48/38* (2013.01); *F16H 48/40* (2013.01); *F16H 55/20* (2013.01); *F16H 2048/082* (2013.01); *F16H 2048/085* (2013.01); *F16H 2048/087* (2013.01); *F16H 2048/387* (2013.01); *F16H 2048/405* (2013.01)

(58) Field of Classification Search
CPC .......... F16H 48/08; F16H 48/40; F16H 55/20; F16H 2048/082; F16H 2048/085; F16H 2048/087; F16H 2048/405
USPC ........................................................ 475/230
See application file for complete search history.

(56) References Cited

U.S. PATENT DOCUMENTS

| | | | |
|---|---|---|---|
| 7,025,702 B2 * | 4/2006 | Saito ....................... | F16H 48/08 475/160 |
| 7,695,392 B2 * | 4/2010 | Isken, II ................. | F16H 48/08 475/230 |
| 8,430,780 B2 * | 4/2013 | Han ........................ | F16H 48/08 475/230 |
| 8,932,172 B2 | 1/2015 | Tanaka et al. | |
| 9,410,605 B2 | 8/2016 | Kluck | |
| 9,625,026 B2 * | 4/2017 | Cochren ................. | F16H 48/34 |
| 10,156,289 B2 * | 12/2018 | De Stefani ......... | B60K 17/3462 |
| 2004/0157696 A1 * | 8/2004 | Saito ....................... | F16H 48/08 475/230 |
| 2004/0162179 A1 | 8/2004 | Krzesicki et al. | |
| 2005/0282677 A1 | 12/2005 | Saito et al. | |
| 2010/0151982 A1 | 6/2010 | Waksmundzki | |

(Continued)

*Primary Examiner* — Leslie A Nicholson, III
(74) *Attorney, Agent, or Firm* — Burris Law, PLLC

(57) ABSTRACT

A driveline component with a differential having a differential gearset mounted in a differential case. The differential gearset has first and second side gears and one or more pinion gears that are meshed with the first and second side gears. The differential gearset is configured to limit inboard thrusting of the first and second side gears so that backlash will be always be present between the pinion gears and each of first and second side gears.

21 Claims, 4 Drawing Sheets

(56) References Cited

U.S. PATENT DOCUMENTS

2016/0334005 A1 11/2016 Adragna et al.
2017/0328460 A1* 11/2017 Schulte .................. F16D 13/52

* cited by examiner

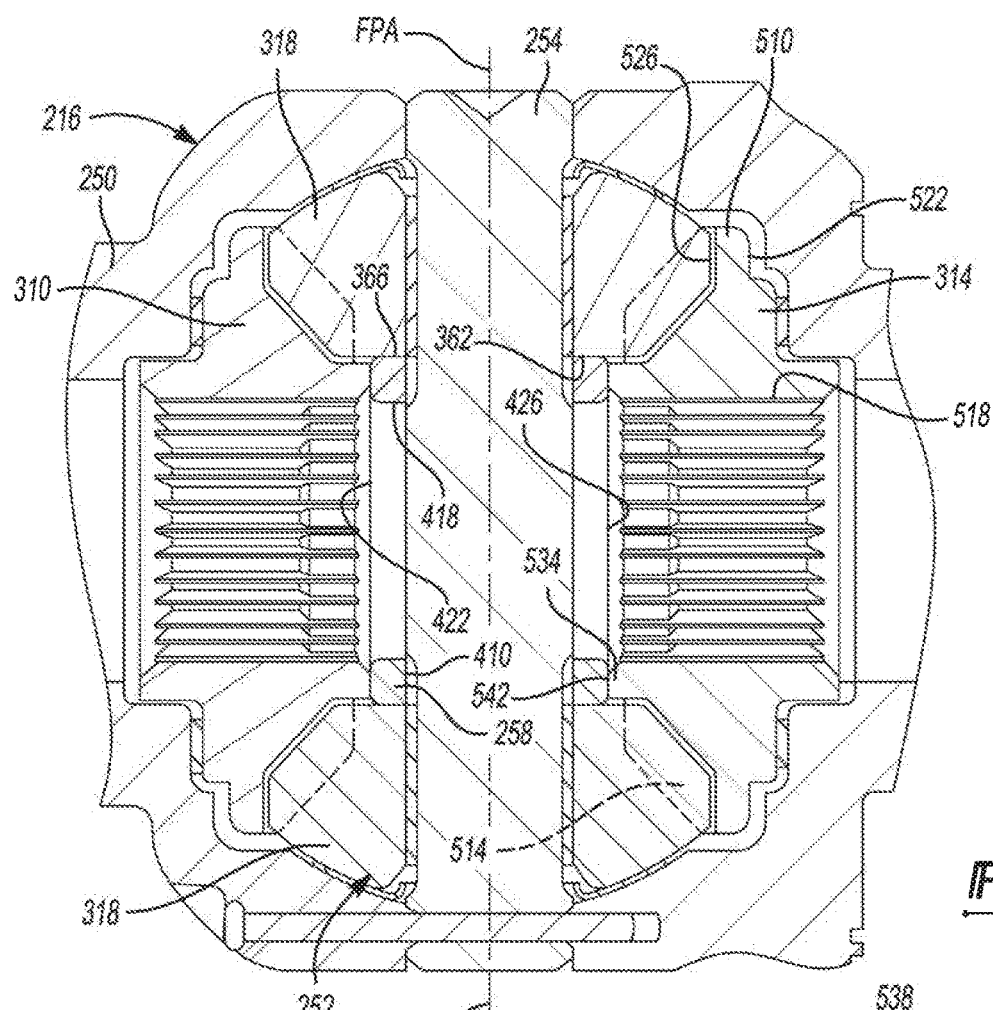
Fig-3
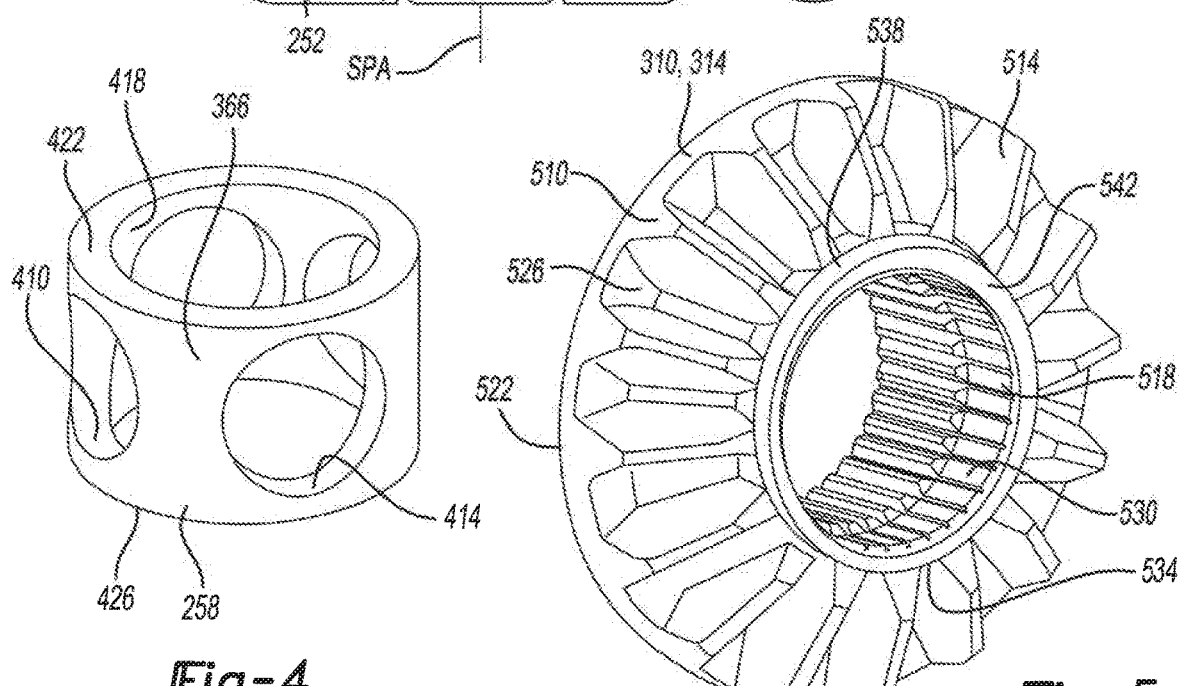
Fig-4
Fig-5

DRIVELINE COMPONENT HAVING DIFFERENTIAL ASSEMBLY WITH DIFFERENTIAL GEARSET CONFIGURED TO LIMIT INBOARD THRUST OF SIDE GEARS

FIELD

The present disclosure relates to a driveline component having a differential assembly with a differential gearset that is configured to limit inboard thrust of a pair of side gears.

BACKGROUND

This section provides background information related to the present disclosure which is not necessarily prior art.

One type of automotive axle assembly is called a split-shaft disconnecting axle and employs a bevel gear differential and a disconnect clutch. One of the side gears of the differential can be drivingly coupled to a first vehicle drive wheel by a first output shaft. The other side gear of the differential can be drivingly coupled to a second output shaft. The second output shaft can be drivingly coupled to an input of the disconnect clutch and the output of the disconnect clutch can be drivingly coupled to a third output shaft that is drivingly coupled to a second vehicle drive wheel. The disconnect clutch can be configured to selectively couple the second and third output shafts.

When the differential case is stationary and the differential side gears are rotating with the drive wheels, adverse noise, vibration, and harshness ("NVH") can occur. At least one condition when this can occur is when the bevel differential side gears are pushed into zero backlash with their mating differential pinion gears, such as when a half-shaft constant velocity joint thrusts inboard to cause axial movement of the side gear for example. Accordingly, there remains a need in the art for an improved axle assembly.

SUMMARY

This section provides a general summary of the disclosure, and is not a comprehensive disclosure of its full scope or all of its features.

In one form, the present teachings provide for a differential assembly including a case, a first pinion gear, a first side gear, a second side gear, and a first spacer. The case can be adapted to be supported for rotation about a first rotary axis. The first pinion gear can be disposed within the case and coupled to the case for common rotation about the first rotary axis with the case and for rotation relative to the case about a first pinion axis that is transverse to the first rotary axis. The first pinion gear can include a plurality of first pinion teeth. The first side gear can be supported within the case for rotation about the first rotary axis relative to the case. The first side gear can include a plurality of first side gear teeth and a first protrusion. The first side gear teeth can be meshingly engaged with the first pinion teeth. The first protrusion can be radially inward of the first pinion teeth and can extend axially further inboard toward the first pinion axis than the first side gear teeth. The second side gear can be supported within the case for rotation about the first rotary axis relative to the case and the first side gear. The second side gear can include a plurality of second side gear teeth and a second protrusion. The second side gear teeth can be meshingly engaged with the first pinion teeth. The second protrusion can be radially inward of the first pinion teeth and can extend axially further inboard toward the first pinion axis than the second side gear teeth. The first spacer can be disposed about the first pinion axis. Contact between the first spacer and the first and second protrusions can inhibit axial movement of the first and second side gears relative to the first pinion gear in an inboard direction toward the first pinion gear.

According to a further embodiment of the invention, the first spacer can be fixedly coupled to the first pinion gear.

According to a further embodiment of the invention, the first spacer can be integrally formed with the first pinion gear.

According to a further embodiment of the invention, the first pinion gear can include a recess and the first spacer can be received in the recess.

According to a further embodiment of the invention, the first spacer can be press-fit into the recess.

According to a further embodiment of the invention, the differential assembly can further include a cross pin disposed about the first pinion axis. The first pinion gear can be disposed about the cross pin. The first spacer can define a first bore and a second bore. The cross pin can extend through the first bore. The second bore can be coaxial with the first rotary axis.

According to a further embodiment of the invention, the differential assembly can further include a second pinion gear and a second spacer. The second pinion gear can be disposed within the case and coupled to the case for common rotation about the first rotary axis with the case and for rotation relative to the case about the first pinion axis. The second pinion gear can include a plurality of second pinion teeth meshingly engaged with the first and second side gear teeth. The second spacer can be disposed about the first pinion axis. Contact between the second spacer and the first and second protrusions can inhibit axial movement of the first and second side gears relative to the second pinion gear in the inboard direction toward the second pinion gear.

According to a further embodiment of the invention, contact between the first spacer and the first and second protrusions can prevent the first pinion teeth from contacting the first and second side gear teeth in a zero backlash condition.

In another form, the present teachings further provide for a differential assembly including a case, a first pinion gear, a first spacer, a first side gear, and a second side gear. The case can be adapted to be supported for rotation about a first rotary axis. The first pinion gear can be disposed within the case and coupled to the case for common rotation about the first rotary axis with the case and for rotation relative to the case about a first pinion axis that is transverse to the first rotary axis. The first pinion gear can include a plurality of first pinion teeth. The first spacer can be coupled to the first pinion gear and disposed about the first pinion axis. The first spacer can include an outer cylindrical surface. The first side gear can be supported within the case for rotation about the first rotary axis relative to the case. The first side gear can include a plurality of first side gear teeth and a first inboard surface. The first side gear teeth can be meshingly engaged with the first pinion teeth. The first inboard surface can contact the outer cylindrical surface of the first spacer to inhibit axial movement of the first side gear relative to the first pinion gear in an inboard direction toward the first pinion gear. The second side gear can be supported within the case for rotation about the first rotary axis relative to the case and the first side gear. The second side gear can include a plurality of second side gear teeth and a second inboard surface. The second side gear teeth can be meshingly engaged with the first pinion teeth. The second inboard surface can contact the outer cylindrical surface of the first spacer to inhibit axial movement of the second side gear relative to the first pinion gear in the inboard direction toward the first pinion gear.

According to a further embodiment of the invention, the first inboard surface can be axially between the first cylindrical surface and an inboard-most part of the first side gear teeth. The second inboard surface can be axially between the first cylindrical surface and an inboard-most part of the second side gear teeth.

According to a further embodiment of the invention, the first spacer can be fixedly coupled to the first pinion gear.

According to a further embodiment of the invention, the first spacer can be integrally formed with the first pinion gear.

According to a further embodiment of the invention, the first pinion gear can include a recess and the first spacer can be received in the recess.

According to a further embodiment of the invention, the first spacer can be press-fit into the recess.

According to a further embodiment of the invention, the differential assembly can further include a second pinion gear and a second spacer. The second pinion gear can be disposed within the case and coupled to the case for common rotation about the first rotary axis with the case and for rotation relative to the case about the first pinion axis. The second pinion gear can include a plurality of second pinion teeth meshingly engaged with the first and second side gear teeth. The second spacer can be disposed about the first pinion axis. Contact between the second spacer and the first and second inboard surfaces can inhibit axial movement of the first and second side gears relative to the second pinion gear in the inboard direction toward the second pinion gear.

According to a further embodiment of the invention, contact between the first spacer and the first and second inboard surfaces can prevent the first pinion teeth from contacting the first and second side gear teeth in a zero backlash condition.

In another form, the present teachings further provide for an axle assembly for a vehicle. The axle assembly can include a first output shaft, a second output shaft, a third output shaft, a clutch, and a differential. The first output shaft can be disposed about a first rotary axis and adapted to be drivingly coupled to a first vehicle wheel. The second output shaft can be disposed about the output axis. The third output shaft can be disposed about the output axis and adapted to be drivingly coupled to a second vehicle wheel. The clutch can be operable in a first mode wherein the clutch couples the second and third output shafts for common rotation about the output axis. The differential can include a case, a first pinion gear, a first spacer, a first side gear, and a second side gear. The case can be supported for rotation about the output axis. The first pinion gear can be disposed within the case and coupled to the case for common rotation about the output axis with the case and for rotation relative to the case about a pinion axis that is perpendicular to the output axis. The first pinion gear can include a plurality of first pinion teeth. The first spacer can be coupled to the first pinion gear and disposed about the pinion axis. The first spacer can include an outer cylindrical surface. The first side gear can be supported within the case for rotation about the output axis relative to the case. The first side gear can include a plurality of first side gear teeth and a first protrusion. The first side gear teeth can be meshingly engaged with the first pinion teeth. Contact between the first protrusion and the outer cylindrical surface of the first spacer can inhibit axial movement of the first side gear relative to the first pinion gear in an inboard direction toward the first pinion gear. The second side gear can be supported within the case for rotation about the output axis relative to the case and the first side gear. The second side gear can include a plurality of second side gear teeth and a second protrusion. The second side gear teeth can be meshingly engaged with the first pinion teeth. Contact between the second protrusion and the outer cylindrical surface of the first spacer can inhibit axial movement of the second side gear relative to the first pinion gear in the inboard direction toward the first pinion gear.

According to a further embodiment of the invention, the first spacer can be integrally formed with the first pinion gear.

According to a further embodiment of the invention, the first pinion gear can include a recess and the first spacer can be received in the recess.

According to a further embodiment of the invention, contact between the first spacer and the first and second inboard surfaces can prevent the first pinion teeth from contacting the first and second side gear teeth in a zero backlash condition.

Further areas of applicability will become apparent from the description and claims herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a sectional view of a portion of the differential of FIG. 2;

FIG. 4 is a perspective view of a spacer of the differential of FIG. 2;

FIG. 5 is a perspective view of a side gear of the differential of FIG. 2;

Corresponding reference numerals indicate corresponding parts throughout the several views of the drawings.

DETAILED DESCRIPTION

Example embodiments will now be described more fully with reference to the accompanying drawings.

Figure 1:
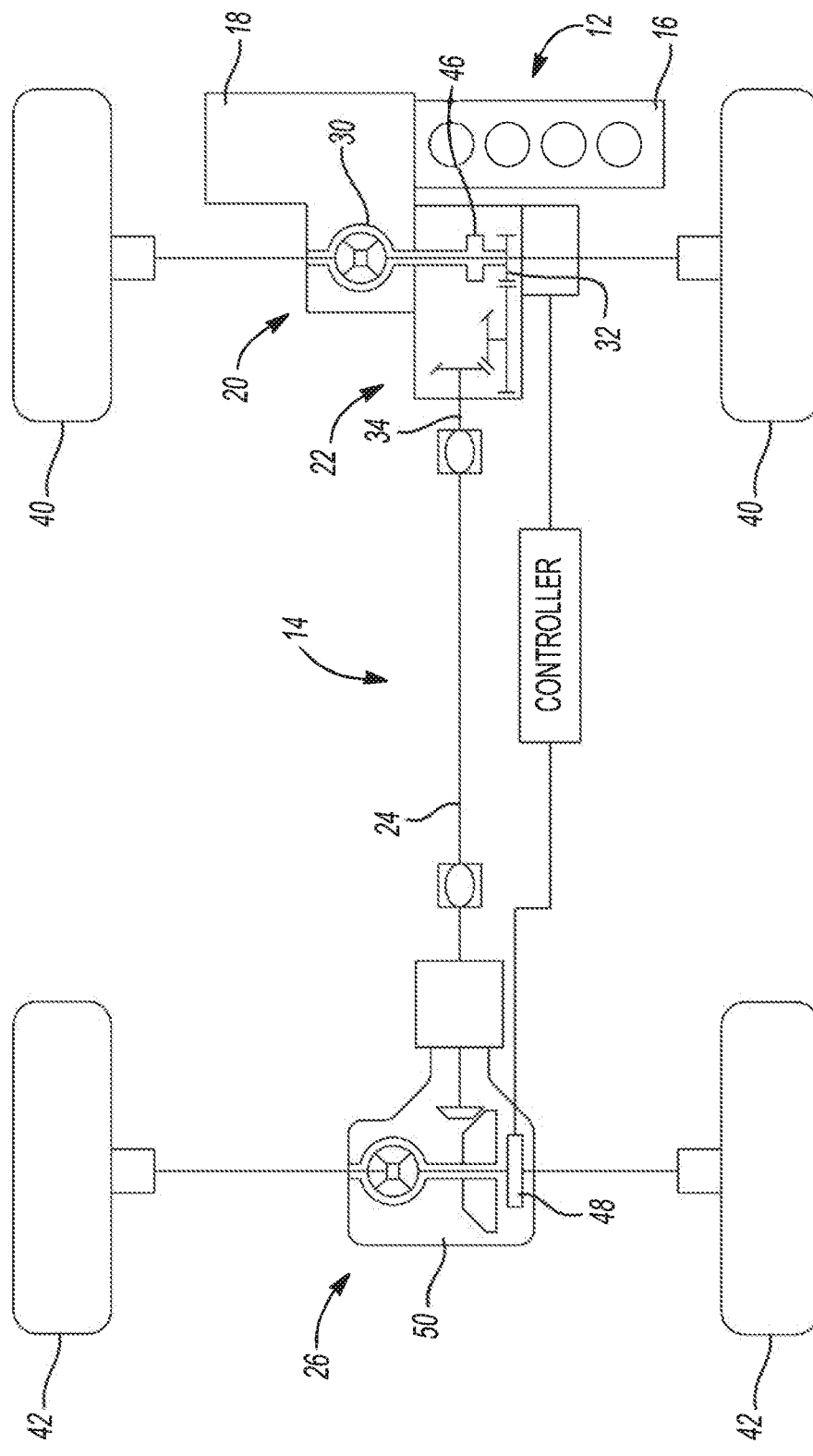
FIG. 1 is a schematic illustration of a motor vehicle equipped with an axle assembly constructed in accordance with the present teachings.

With reference to FIG. 1 of the drawings, an example of a vehicle having a clutched device constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive ("AWD") configuration, but those of skill in the art will appreciate that the teachings of the present disclosure are applicable to other drive train configurations, including four-wheel drive ("4WD") configurations, two-wheel drive ("2WD"), rear-wheel drive configurations ("RWD"), and front-wheel drive ("FWD") configurations. The drive train 14 can include a front axle assembly 20, a power take-off unit (PTU) 22, a prop shaft 24 and a rear axle assembly 26.

The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module.

The front axle assembly 20 and the rear axle assembly 26 can be driven on a full-time basis to drive front and rear vehicle wheels 40 and 42, respectively. The drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to control rotation of components within the rear axle assembly 26.

In the particular example provided, the rear axle assembly 26 includes a rear drive module 50 (i.e., a clutched device) that is constructed in accordance with the teachings of the present disclosure. It will be appreciated, however, that the teachings of the present disclosure have application to various other clutched devices, such as power take-offs, front axle assemblies, and any other power transmitting components that have a differential and a split-shaft axle shaft.

Figure 2:
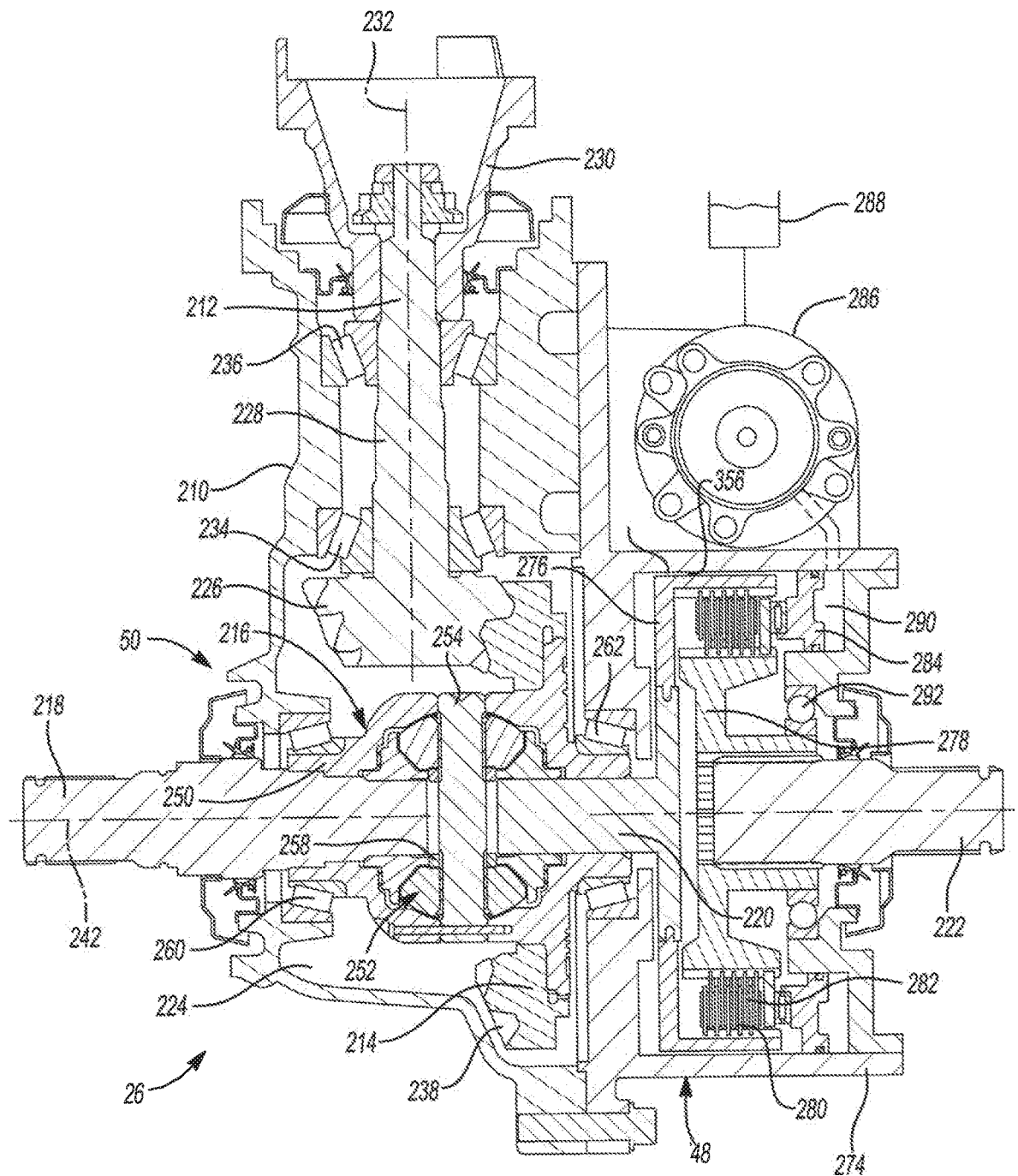
FIG. 2 is a sectional view of the axle assembly of FIG. 1, illustrating a differential of the axle assembly.

With reference to FIG. 2, the rear drive module 50 is illustrated in more detail. In the example provided, the rear drive module 50 is a type known as a split-shaft drive module. The rear drive module 50 can include a housing 210, an input pinion 212, an input member 214, the second clutch 48, a differential assembly 216, a first output shaft 218, a second output shaft 220, and a third output shaft 222. The housing 210 can define a first cavity 224 and the input pinion 212 can be a hypoid pinion having a hypoid gear 226, an input pinion shaft 228, and an input pinion flange 230. The input pinion flange 230 can be drivingly coupled to the prop shaft 24 (FIG. 1). The hypoid gear 226 can be disposed within the first cavity 224. The input pinion shaft 228 can be supported for rotation in the housing 210 along a first axis 232 by a head bearing 234 proximate to the hypoid gear 226 and a tail bearing 236 distal to the hypoid gear 226 and proximate to the input pinion flange 230 and prop shaft 24. The input member 214 can be a ring gear having a gear face 238. The input member 214 can be supported for rotation in the housing 210 about an output axis or second axis 242. The second axis 242 can be generally transverse or perpendicular to the first axis 232. The gear face 238 can be meshingly engaged with the hypoid gear 226.

The differential assembly 216 can be any suitable type of bevel gear differential configured to receive input torque from the input member 214 and output differential output torque to the first and second output shafts 218, 220. In the example provided, the differential assembly 216 is an open differential including a differential case 250, a differential gearset 252, and a cross pin 254. In the example provided, the differential assembly 216 can include a spacer 258. The differential case 250 can be drivingly coupled to the input member 214 and configured for common rotation about the second axis 242 within the first cavity 224. The differential case 250 can be supported within the housing 210 by a pair of bearings 260, 262 on opposite axial ends of the differential case 250. The differential case 250 can be coupled to the input member 214 for common rotation about the second axis 242 such as by fasteners (not shown) or welding for example. The differential gearset 252 can be configured to transmit rotary power between the differential case 250 and the first and second output shafts 218, 220.

With additional reference to FIG. 3, the differential gearset 252 can include a first side gear 310, a second side gear 314, and a plurality of differential pinion gears 318 disposed within the differential case 250. The pinion gears 318 can be coupled for rotation with the differential case 250 about the second axis 242 and coupled for rotation relative to the differential case 250 about the cross pin 254 (i.e., about respective first and second pinion axes FPA and SPA). In the example provided, the first and second pinion axes FPA and SPA are coincident. The cross pin 254 can be generally perpendicular to the second axis 242 and mounted to the differential case 250 for common rotation about the second axis 242. The pinion gears 318 can rotate independently of one another. In the example provided, the differential gearset 252 includes two pinion gears 318 disposed on opposite ends of the straight cross pin 254, though other configurations can be used, such as three or more pinion gears on a corresponding cross pin or cross pin assembly (not specifically shown).

The first and second side gears 310, 314 can be disposed about the second axis 242 and mounted within the differential case 250, on opposite axial sides of the differential case 250, for rotation relative to the differential case 250 about the second axis 242. The pinion gears 318 and the first and second side gears 310, 314 can be bevel gears. The first side gear 310 can be meshingly engaged with the pinion gears 318. The second side gear 314 can be meshingly engaged with the pinion gears 318. The inboard end of the first output shaft 218 can be non-rotatably coupled to the first side gear 310 for common rotation about the second axis 242, such as via mating splines for example. Thus, the first output shaft 218 can be drivingly coupled to the first side gear 310 and can be coupled for common rotation therewith. The first output shaft 218 can be drivingly coupled to one of the rear wheels 42 (FIG. 1). The inboard end of the second output shaft 220 can be non-rotatably coupled to the second side gear 314 for common rotation about the second axis 242, such as via mating splines for example. Thus, the second output shaft 220 can be drivingly coupled to the second side gear 314 and can be coupled for common rotation therewith. The third output shaft 222 can be drivingly coupled to the other one of the rear wheels 42 (FIG. 1)

and can be selectively drivingly coupled to the second output shaft 220 by the second clutch 48, as described in greater detail below.

Returning to FIG. 2, the second clutch 48 can be selectively operated to transmit rotary power from the second output shaft 220 to the third output shaft 222. In the particular example provided, the second clutch 48 is a friction clutch that is mounted coaxially with the input member 214 and the differential assembly 216 about the second axis 242. While the second clutch 48 is illustrated and described herein as a friction clutch, the second clutch 48 can be any suitable type of disconnecting clutch, such as a dog clutch for example.

In the example provided, the second clutch 48 can include a clutch housing 274, an outer clutch plate carrier 276, an inner clutch plate carrier 278, a plurality of first clutch plates 280, a plurality of second clutch plates 282, a piston 284, a pump 286, and a reservoir 288. The clutch housing 274 can be integrally formed with or partially formed by the housing 210 of the rear drive module 50 or can be separately formed and mounted to the housing 210. The clutch housing 274 can define a piston chamber 290.

One of the outer and inner clutch plate carriers 276, 278 can be non-rotatably coupled to the third output shaft 222 and the plurality of first clutch plates 280. The other of the outer and inner clutch plate carriers 276, 278 can be non-rotatably coupled to the second output shaft 220 and the plurality of second clutch plates 282. In the particular example provided, the outer clutch plate carrier 276 is non-rotatably coupled to the second output shaft 220 and the plurality of first clutch plates 280, while the inner clutch plate carrier 278 is non-rotatably coupled to the third output shaft 222 and the plurality of second clutch plates 282.

The inner clutch plate carrier 278 and the third output shaft 222 can be supported within the clutch housing 274 for rotation relative thereto by a bearing 292. In the example provided, the inner clutch plate carrier 278 includes a set of interior splines that are meshingly engaged with a set of exterior splines formed on the third output shaft 222 to non-rotatably couple the third output shaft 222 and the inner clutch plate carrier 278. The second clutch plates 282 can be interleaved with the first clutch plates 280 radially between the outer and inner clutch plate carriers 276, 278.

The piston 284 can be received in the piston chamber 290 and configured to translate along the second axis 242. The piston 284 can be configured to move within the piston chamber 290 between an extended position and a retracted position relative to the plurality of first and second clutch plates 280, 282. The pump 286 can be mounted to the housing 210 or the clutch housing 274. The pump 286 can be fluidly coupled to the reservoir 288 and fluidly coupled to the piston chamber 290. The reservoir 288 can be configured to hold a hydraulic fluid. The pump 286 can be operated in a first mode to pump the hydraulic fluid in a first direction to supply the hydraulic fluid from the reservoir 288 to the piston chamber 290 to move the piston 284 from the retracted position to the extended position. The pump 286 can be operated in a second mode to pump hydraulic fluid in a second direction to selectively remove hydraulic fluid from the piston chamber 290 to the reservoir 288 to move the piston 284 from the extended position to the retracted position.

The piston 284 can be configured to translate along the second axis 242 to selectively compress the first and second clutch plates 280, 282 against one another so that the second clutch 48 can transmit rotary power between the second and third output shafts 220, 222. It will be appreciated that the second clutch 48 can be configured to not transmit rotary power between the second and third output shafts 220, 222 when the piston 284 is in the retracted position. The second clutch 48 can also be configured to transmit various levels of torque by varying the position of the piston 284 relative to the first and second clutch plates 280, 282.

Returning to FIG. 3 and with additional reference to FIGS. 4 and 5, the spacer 258 can have a generally cylindrical shape disposed coaxially about the second axis 242. The spacer 258 can define a first bore 410 extending through the spacer 258 along an axis that is perpendicular to the second axis 242 and aligns with the longitudinal axis of the cross pin 254. In alternative configurations having additional pinion gears (not shown), the spacer 258 can have additional bores to receive the portions of the cross pin or cross pin assembly that correspond to the additional pinion gears. For example, when four pinion gears are used, the spacer 258 can define an additional bore 414 extending through the spacer 258 along another axis that is perpendicular to the second axis 242 and perpendicular to the axis of the first bore 410. While the additional bore 414 is illustrated in FIG. 4, the additional bore 414 is optional when only two pinion gears are used.

In the example provided, the spacer 258 can define a second bore 418 coaxial with the second axis 242. The second bore 418 can extend through the spacer 258, intersecting the first bore 410, so that the second bore 418 is open at an axial first end 422 of the spacer 258 and an axial second end 426 of the spacer 258. The second bore 418 can have a diameter larger than a diameter of the inboard ends of the first and second output shafts 218, 220, such that the inboard ends of the first and second output shafts 218, 220 can be received in the second bore 418. The cross pin 254 can extend through the spacer 258 via the first bore 410.

With specific reference to FIGS. 3 and 5, the first side gear 310 can be similar to the second side gear 314, and thus the side gear illustrated in FIG. 5 is indicated by reference numerals 310 and 314. Each side gear 310, 314 can include an annular base 510, a plurality of bevel gear teeth 514, and an annular hub 518. The annular base 510 can be disposed about the second axis 242 and can have an outboard side 522 (relative to the cross pin 254) that faces axially away from the cross pin 254 and an inboard side 526 that faces axially toward the cross pin 254. The outboard side 522 can oppose an inboard facing surface of the differential case 250. The outboard side 522 can contact the inboard facing surface of the differential case 250 in a manner that permits the side gear 310, 314 to rotate relative to the differential case 250, or a bearing (not specifically shown) can be disposed there between. The annular base 510 can be non-rotatably coupled to the annular hub 518 and can be disposed about the annular hub 518.

The annular hub 518 can have a center body 530 and a protrusion 534. The annular hub 518 can be disposed about the second axis 242 and can define a plurality of radially inward facing splines configured to mate with exterior facing splines defined by the first or second output shaft 218, 220. In the example provided, the annular hub 518 can be unitarily formed from a single piece of material. The center body 530 can be radially inward of the annular base 510 and the bevel gear teeth 514 and fixedly coupled thereto. The center body 530 can extend axially outboard of the annular base 510. The portion of the center body 530 that is outboard of the annular base 510 can be generally cylindrical in shape and can be received in a recess within the differential case 250 to locate the side gear 310, 314 coaxially about the second axis 242. The protrusion 534 can extend axially inboard from the center body 530 and can be axially inboard of the annular base 510.

The bevel gear teeth 514 can extend generally at an angle from the inboard side 526 of the annular base 510, radially inward and axially inboard to the center body 530. The protrusion 534 can extend axially inboard of an axially inboard-most part of the bevel gear teeth 514, such that the bevel gear teeth 514 are entirely outboard of the protrusion 534. The protrusion 534 can be generally cylindrical in shape and can have a radially outward facing surface 538 and an axially inboard facing surface 542. The protrusion 534 can extend axially inboard of the teeth of the pinion gears 318, such that the protrusion 534 does not engage the teeth of the differential pinions 246.

A radially inward-most (relative to the second axis 242) face 362 of each pinion gear 318 can oppose a radially outward-most face 366 of the spacer 258. The radially inward-most face 362 of each pinion gear 318 can contact the radially outward-most face 366 of the spacer 258. The axially inboard facing surface 542 of the protrusion 534 can oppose and contact an outboard-most surface of the spacer 258 such as the first end 422 or the second end 426. Contact between the protrusion 534 and the first or second end 422, 426 of the spacer 258 can inhibit inboard movement of the side gear 310, 314. Contact between the cross pin 254 and the spacer 258 can inhibit axial movement of the spacer 258. Thus, the spacer 258 can inhibit the teeth 514 of the side gear 310, 314 from bottoming out on the teeth of the pinion gears 318 which would otherwise create a zero backlash condition, such as when both opposite surfaces of a gear tooth are in contact with adjacent ones of the mating gear teeth (e.g., both sides of a tooth of the pinion gear 318 contact teeth of the side gear 310 or 314, or alternatively both sides of one tooth of the side gear 310, or 314 contact teeth of the pinion gear 318). Such zero-backlash condition can occur when the differential case 250 is stationary and the side gears 310, 314 rotate with the wheels 40 (FIG. 1) for example.

Figure 6:
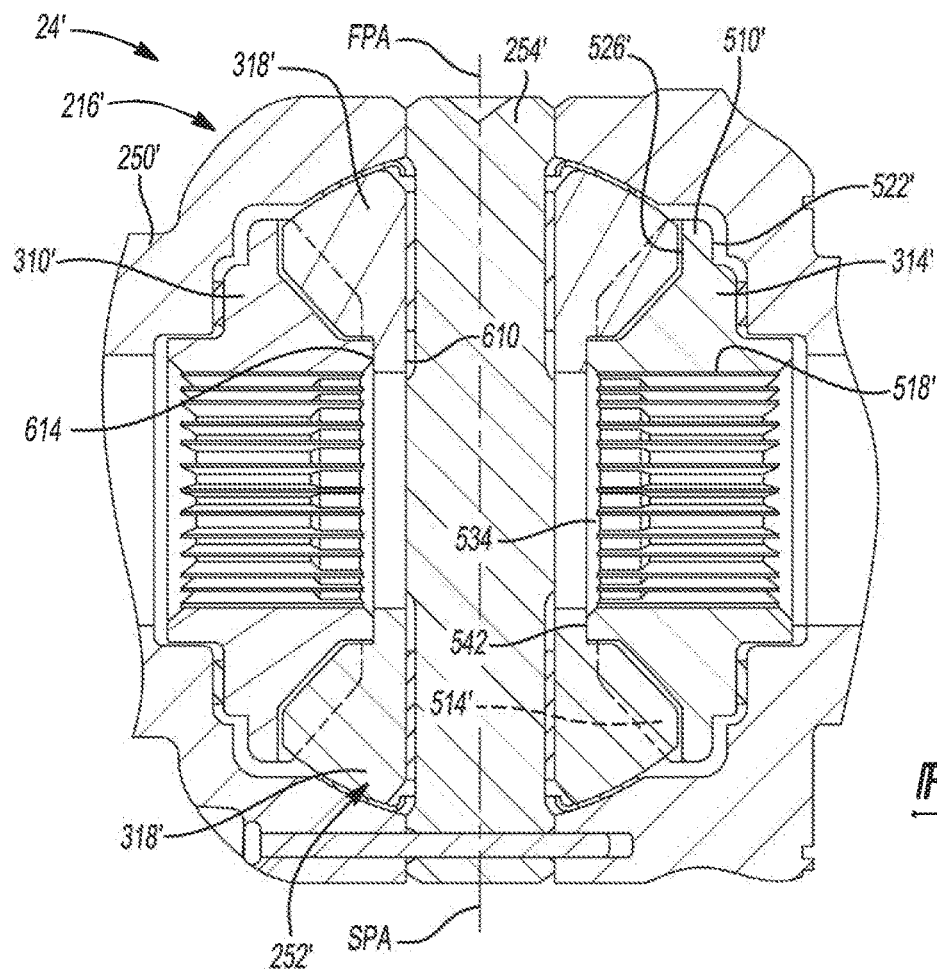
FIG. 6 is a cut-away view of a portion of a differential of a second construction in accordance with the present teachings.

With additional reference to FIG. 6, a portion of an axle assembly 24' of a second construction is illustrated. While only a portion of the axle assembly 24' is illustrated in FIG. 6, the axle assembly 24' can be similar to the axle assembly 24 (FIGS. 1-5), except as otherwise illustrated or described herein. Features that are similar to those of the axle assembly 24 (FIGS. 1-5) are shown and described herein with reference to similar, but primed reference numerals. Accordingly, similar features are not repeated herein in detail. The axle assembly 24' can include a differential assembly 216' that can be similar to the differential assembly 216, except as otherwise illustrated or described herein. The differential assembly 216' can be any suitable type of bevel gear differential configured to receive input torque from the input member 214 (FIG. 2) and output differential output torque to the first and second output shafts 218, 220 (FIG. 2). In the example provided, the differential assembly 216' is an open differential including a differential case 250', a differential gearset 252', and a cross pin 254'. In the example provided, the differential assembly 216' does not include the spacer 258 (FIGS. 3 and 4).

The differential pinion gears 318' can be similar to the differential pinion gears 318, except that each differential pinion gear 318' can include a protrusion or spacer 610 that extends radially inward relative to the second axis 242' (i.e., axially relative to the cross pin 254') of the protrusions 534' of the first and second side gears 310', 314'. The pinion gear 318', including the spacer 610, can be integrally formed from a single piece of material. The spacer 610 can be generally cylindrical in shape disposed about the cross pin 254'. The spacer 610 can extend radially inward (relative to the second axis 242') of a radially inward-most part of the teeth of the pinion gear 318'. The spacer 610 can have an outer cylindrical surface 614 that can contact the axially inboard facing surface 542' of the protrusion 534' of the side gears 310', 314'. In the example provided, the spacer 610 can inhibit axial movement of the side gears 310', 314' to inhibit the teeth 514' of the side gears 310', 314' from bottoming out on the teeth of the pinion gears 318' which would otherwise create a zero backlash condition, such as when both opposite surfaces of a gear tooth are in contact with adjacent ones of the mating gear teeth (e.g., both sides of a tooth of the pinion gear 318' contact teeth of the side gear 310' or 314', or alternatively both sides of one tooth of the side gear 310' or 314' contact teeth of the pinion gear 318'). Such zero-backlash condition can occur when the differential case 250' is stationary and the side gears 310', 314' rotate with the wheels 40 (FIG. 1) for example.

Figure 7:
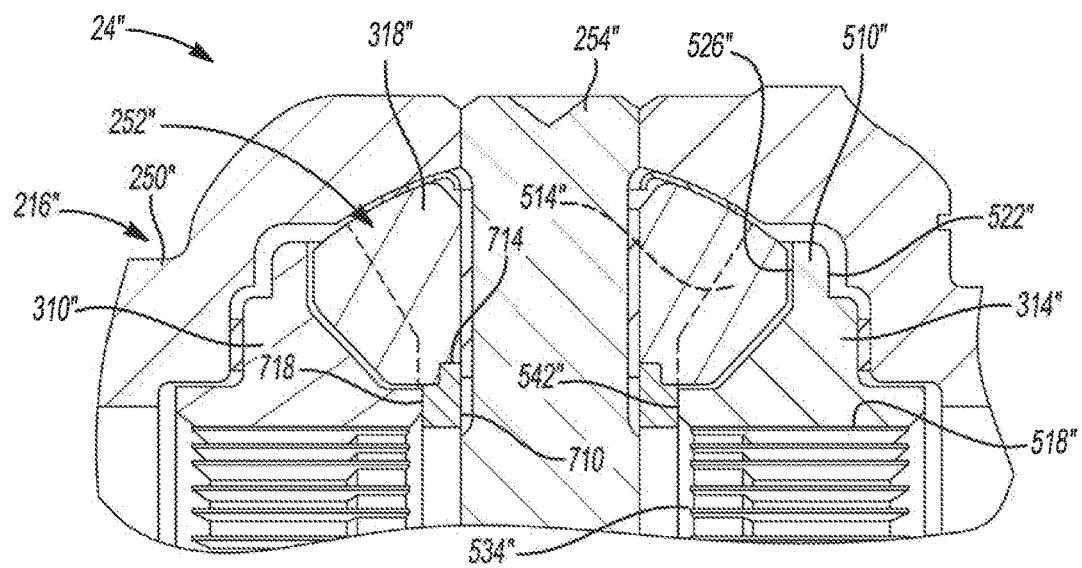
FIG. 7 is a sectional view of a portion of a differential of a third construction in accordance with the present teachings.

With additional reference to FIG. 7, a portion of an axle assembly 24" of a second construction is illustrated. While only a portion of the axle assembly 24" is illustrated in FIG. 7, the axle assembly 24" can be similar to the axle assembly 24 (FIGS. 1-5) and 24' (FIG. 6), except as otherwise illustrated or described herein. Features that are similar to those of the axle assembly 24 (FIGS. 1-5) or axle assembly 24' are shown and described herein with reference to similar, but double primed reference numerals. Accordingly, similar features are not repeated herein in detail. The axle assembly 24" can include a differential assembly 216" that can be similar to the differential assembly 216, 216', except as otherwise illustrated or described herein. The differential assembly 216" can be any suitable type of bevel gear differential configured to receive input torque from the input member 214 (FIG. 2) and output differential output torque to the first and second output shafts 218, 220 (FIG. 2). In the example provided, the differential assembly 216" is an open differential including a differential case 250", a differential gearset 252", and a cross pin 254". In the example provided, the differential assembly 216" does not include the spacer 258 (FIGS. 3 and 4), but does include a plurality of spacers 710, each spacer 710 corresponding to one of the pinion gears 318".

The differential pinion gears 318" that can be similar to the differential pinion gears 318, except that each differential pinion gear 318" can include a recess 714 in the radially inward (relative to the second axis 242") axial end of the pinion gear 318". In other words, the recess 714 can extend radially outward (relative to the second axis 242") of the teeth of the pinion gear 318". Each spacer 710 can be generally cylindrical in shape disposed about the cross pin 254". The spacer can be coaxially received in the recess 714 and can extend radially inward (relative to the second axis 242') of a radially inward-most part of the teeth of the pinion gear 318". In the example provided, the spacer 710 is press-fit into the recess 714, though other configurations can be used. The spacer 710 can have an outer cylindrical surface 718 that can contact the axially inboard facing surface 542" of the protrusion 534" of the side gears 310", 314". In the example provided, the spacer 710 can inhibit axial movement of the side gears 310", 314" to inhibit the teeth 514" of the side gears 310", 314" from bottoming out on the teeth of the pinion gears 318" which would otherwise create a zero backlash condition, such as when both opposite surfaces of a gear tooth are in contact with adjacent ones of the mating gear teeth (e.g., both sides of a tooth of the pinion gear 318" contact teeth of the side gear 310" or 314", or alternatively both sides of one tooth of the side gear 310" or 314" contact teeth of the pinion gear 318"). Such zero-backlash condition can occur when the differential case 250" is stationary and the side gears 310", 314" rotate with the wheels 40 (FIG. 1) for example. In other words, the spacer 710 can be a protrusion, similar to the spacer 610 (FIG. 6) that is separately formed from the pinion gears 318".

In an alternative construction, not specifically shown, the side gears 310, 314, 310', 314' or 310", 314" can be constructed without the protrusions 534, 534', 534" integrally formed therewith. Instead, the side gears 310, 314, 310', 314' or 310", 314" can define a recess (not specifically shown) similar to the recess 714 of the pinion gears 318" that extends into the side gear 310, 314, 310', 314', 310", 314" from the inboard side thereof. A spacer (not specifically shown, but similar to the spacer 710), can be separately formed from the rest of the side gear 310, 314, 310', 314' or 310", 314" and can be press-fit into the recess of the side gear 310, 314, 310', 314', 310", 314". Thus, the spacer of the side gear 310, 314, 310', 314', 310", 314" can abut the spacer 258, the spacer 610, or the spacer 710 to inhibit axial movement of the side gears 310, 314, 310', 314' or 310", 314".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A driveline component comprising:
   a differential case that is rotatable about a first rotary axis;
   a first pinion gear disposed within the differential case, the first pinion gear being coupled to the differential case for common rotation about the first rotary axis with the differential case and for rotation relative to the differential case about a first pinion axis that is transverse to the first rotary axis, the first pinion gear including a plurality of first pinion teeth;
   a first spacer disposed in an annular manner about the first pinon axis and being coupled to the first pinion gear for rotation therewith about the first rotary axis, the first spacer including an outer cylindrical surface;
   a first side gear received in the differential case and rotatable about the first rotary axis relative to the differential case, the first side gear including a plurality of first side gear teeth and a first inboard surface, the first side gear teeth being meshingly engaged with the first pinion teeth, the first inboard surface being configured to contact the outer cylindrical surface of the first spacer to limit axial movement of the first side gear relative to the first pinion gear in a first direction along the first rotary axis toward the first pinion gear; and
   a second side gear received in the differential case and rotatable about the first rotary axis relative to the differential case and the first side gear, the second side gear including a plurality of second side gear teeth and a second inboard surface, the second side gear teeth being meshingly engaged with the first pinion teeth, the second inboard surface being configured to contact the outer cylindrical surface of the first spacer to limit axial movement of the second side gear relative to the first pinion gear in a second direction along the first rotary axis toward the first pinion gear.

2. The driveline component of claim 1, wherein the first inboard surface is axially between the outer cylindrical surface and an inboard-most part of the first side gear teeth, and wherein the second inboard surface is axially between the outer cylindrical surface and an inboard-most part of the second side gear teeth.

3. The driveline component of claim 1, wherein the first spacer is fixedly coupled to the first pinion gear.

4. The driveline component of claim 3, wherein the first spacer is unitarily and integrally formed with the first pinion gear.

5. The driveline component of claim 1, wherein the first pinion gear includes a recess and the first spacer is received in the recess.

6. The driveline component of claim 5, wherein the first spacer is press-fit into the recess.

7. The driveline component of claim 1, further comprising a second pinion gear and a second spacer, the second pinion gear being received in the differential case, the second pinion gear being coupled to the differential case for rotation with the differential case about the first rotary axis and for rotation relative to the differential case about a second pinion axis that is transverse to the first rotary axis, the second pinion gear including a plurality of second pinion teeth meshingly engaged with the first and second side gear teeth, the second spacer being disposed about the second pinion axis, wherein contact between the second spacer and the first inboard surface is configured to limit axial movement of the first side gear relative to the second pinion gear in the first direction along the first rotary axis toward the second pinion gear, and wherein contact between the second spacer and the second inboard surface is configured to limit axial movement of the second side gear relative to the second pinion gear in the second direction along the first rotary axis toward the second pinion gear.

8. The driveline component of claim 7, wherein the first and second pinion axes are coincident.

9. The driveline component of claim 8, wherein the first and second pinion gears are rotatably mounted on a cross-pin that is non-rotatably mounted to the differential case.

10. The driveline component of claim 1, wherein contact between the first spacer and the first and second inboard surfaces prevents the first pinion teeth from contacting the first and second side gear teeth in a zero backlash condition.

11. The driveline component of claim 1, further comprising:
    a first output shaft rotatably coupled to the first side gear and adapted to be drivingly coupled to a first vehicle wheel;
    a second output shaft rotatably coupled to the second side gear;
    a third output shaft disposed about the first rotary axis and adapted to be drivingly coupled to a second vehicle wheel;
    a clutch operable in a first mode, in which the clutch couples the second and third output shafts for common rotation about the first rotary axis, and a second mode in which the clutch rotationally decouples the second output shaft from the third output shaft.

12. The driveline component of claim 1, wherein the first spacer is integrally and unitarily formed with the first pinion gear.

13. A driveline component comprising:
    a differential case that is rotatable about a first rotary axis;

a first pinion gear disposed within the differential case and coupled to the differential case for common rotation about the first rotary axis with the differential case and for rotation relative to the differential case about a first pinion axis that is transverse to the first rotary axis, the first pinion gear including a plurality of first pinion teeth;

a first side gear received in the differential case and rotatable about the first rotary axis relative to the differential case, the first side gear including a plurality of first side gear teeth that are meshed with the first pinion teeth;

a second side gear received in the differential case and rotatable about the first rotary axis relative to the differential case and the first side gear, the second side gear including a plurality of second side gear teeth that are meshed with the first pinion teeth; and means for limiting inboard thrust of the first and second side gears in respective directions along the first rotary axis toward the first pinion gear, the inboard thrust limiting means being configured to ensure that a non-zero amount of backlash is present between the first pinion gear and each of the first and second side gears when the first and second side gears are positioned closest to one another;

wherein the inboard thrust limiting means comprises a spacer that is fixedly coupled to the first pinion gear.

14. The driveline component of claim 13, wherein the spacer is unitarily and integrally formed with the first pinion gear.

15. The driveline component of claim 13, further comprising:
a first output shaft rotatably coupled to the first side gear and adapted to be drivingly coupled to a first vehicle wheel;
a second output shaft rotatably coupled to the second side gear;
a third output shaft disposed about the first rotary axis and adapted to be drivingly coupled to a second vehicle wheel;
a clutch operable in a first mode, in which the clutch couples the second and third output shafts for common rotation about the first rotary axis, and a second mode in which the clutch rotationally decouples the second output shaft from the third output shaft.

16. A driveline component comprising:
a differential case that is rotatable about a first rotary axis;
a first pinion gear disposed within the differential case and coupled to the differential case for common rotation about the first rotary axis with the differential case and for rotation relative to the differential case about a first pinion axis that is transverse to the first rotary axis, the first pinion gear including a plurality of first pinion teeth;
a first side gear received in the differential case and rotatable about the first rotary axis relative to the differential case, the first side gear including a plurality of first side gear teeth that are meshed with the first pinion teeth;
a second side gear received in the differential case and rotatable about the first rotary axis relative to the differential case and the first side gear, the second side gear including a plurality of second side gear teeth that are meshed with the first pinion teeth; and
means for limiting inboard thrust of the first and second side gears in respective directions along the first rotary axis toward the first pinion gear, the inboard thrust limiting means being configured to ensure that a non-zero amount of backlash is present between the first pinion gear and each of the first and second side gears when the first and second side gears are positioned closest to one another;
wherein the inboard thrust limiting means comprises a first spacer, wherein the first pinion gear includes a recess and wherein the first spacer is received in the recess.

17. The driveline component of claim 16, wherein the first spacer is press-fit into the recess.

18. The driveline component of claim 16, further comprising a second pinion gear that is disposed within the differential case, and the second pinion gear being coupled to the differential case for rotation with the differential case about the first rotary axis and for rotation relative to the differential case about a second pinion axis that is transverse to the first rotary axis, the second pinion gear including a plurality of second pinion teeth that are meshingly engaged with the first and second side gear teeth, wherein the inboard thrust limiting means further comprises a second spacer, the second spacer being disposed about the second pinion axis.

19. The driveline component of claim 18, wherein the first and second pinion axes are coincident.

20. The driveline component of claim 19, wherein the first and second pinion gears are rotatably mounted on a cross-pin that is non-rotatably mounted to the differential case.

21. The driveline component of claim 20, further comprising:
a first output shaft rotatably coupled to the first side gear and adapted to be drivingly coupled to a first vehicle wheel;
a second output shaft rotatably coupled to the second side gear;
a third output shaft disposed about the first rotary axis and adapted to be drivingly coupled to a second vehicle wheel;
a clutch operable in a first mode, in which the clutch couples the second and third output shafts for common rotation about the first rotary axis, and a second mode in which the clutch rotationally decouples the second output shaft from the third output shaft.

* * * * *

UNITED STATES PATENT AND TRADEMARK OFFICE
CERTIFICATE OF CORRECTION

PATENT NO. : 10,612,637 B2
APPLICATION NO. : 15/873926
DATED : April 7, 2020
INVENTOR(S) : Douglas J. Chemelli et al.

Page 1 of 1

It is certified that error appears in the above-identified patent and that said Letters Patent is hereby corrected as shown below:

In the Claims

In Column 14, In Line 41 of Claim 21, delete "claim 20," and insert --claim 16,-- therefor.

Signed and Sealed this
Twenty-sixth Day of May, 2020

Andrei Iancu
*Director of the United States Patent and Trademark Office*